April 29, 1924.
R. BALMER
DEVICE FOR SEPARATING DUST FROM GASES
Original Filed Dec. 24, 1921    2 Sheets-Sheet 1
1,492,116
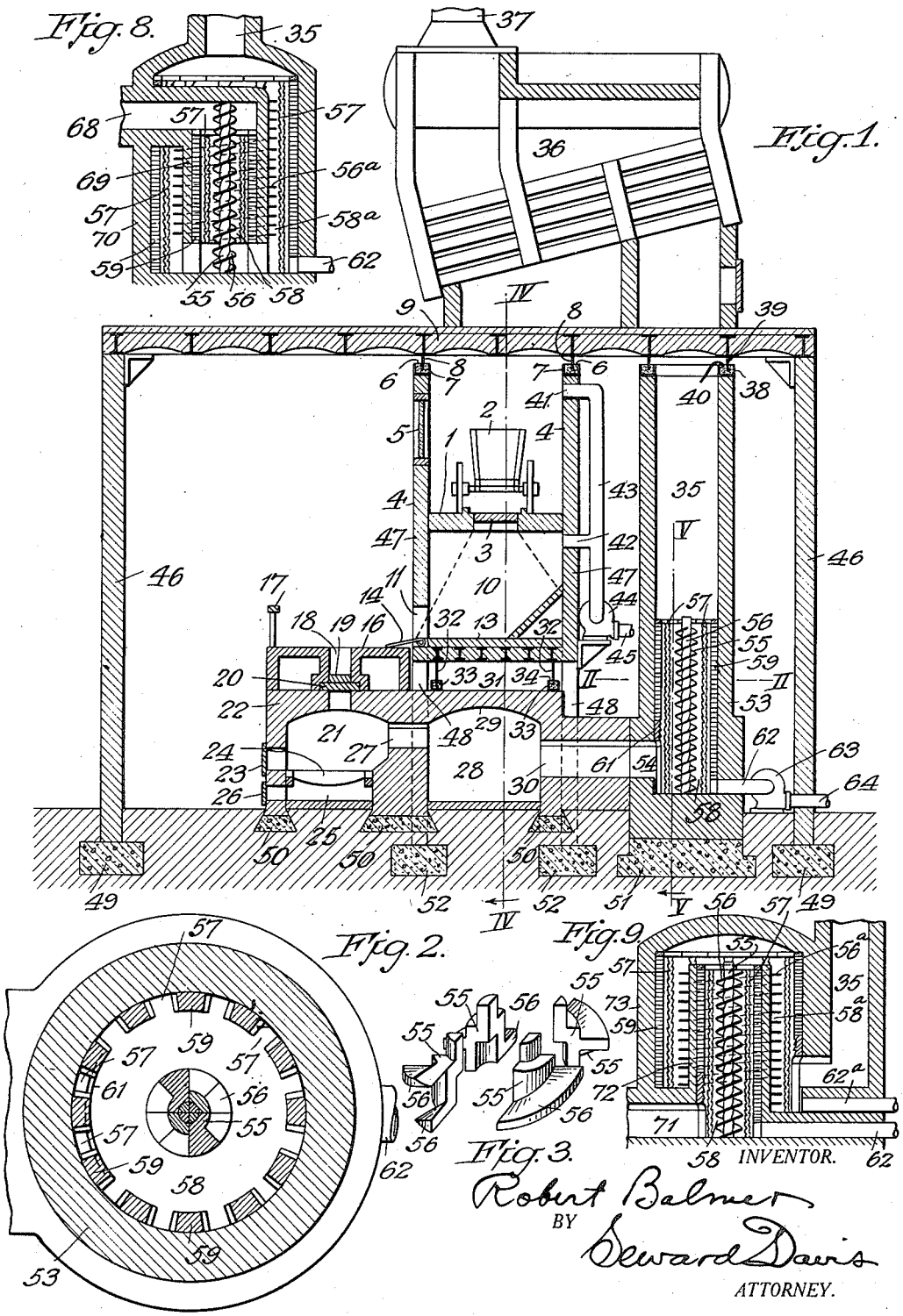
INVENTOR.
Robert Balmer
BY Seward Davis
ATTORNEY.

April 29, 1924.  1,492,116
R. BALMER
DEVICE FOR SEPARATING DUST FROM GASES
Original Filed Dec. 24, 1921   2 Sheets-Sheet 2
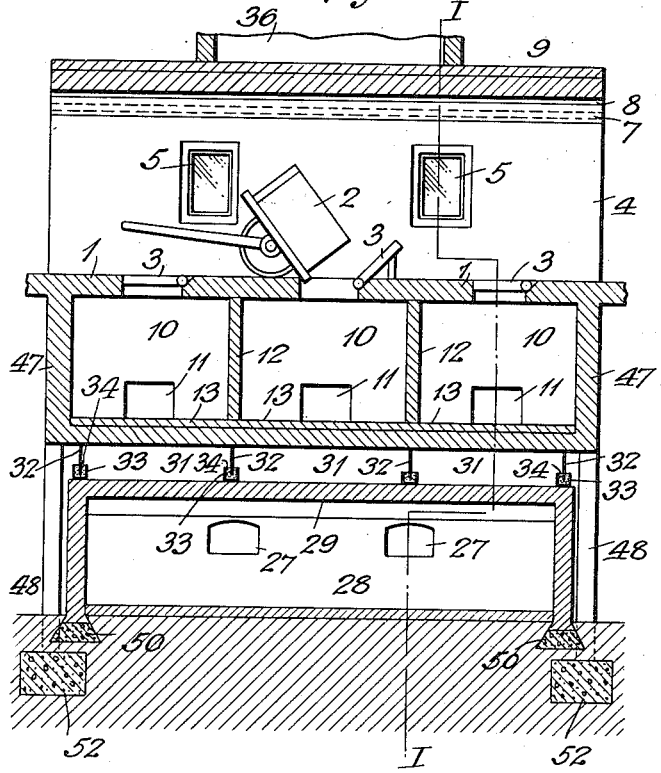
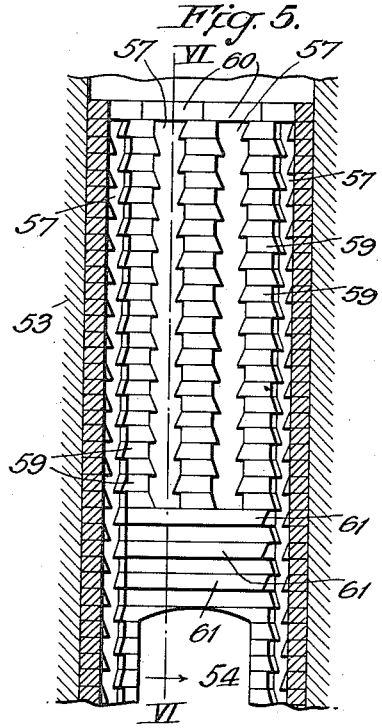
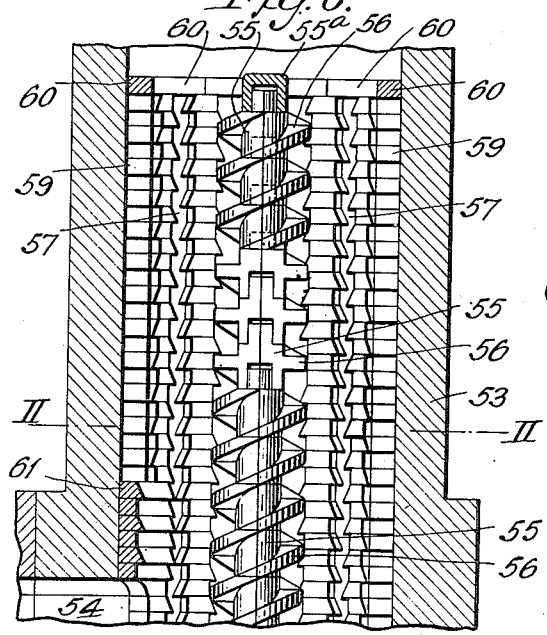
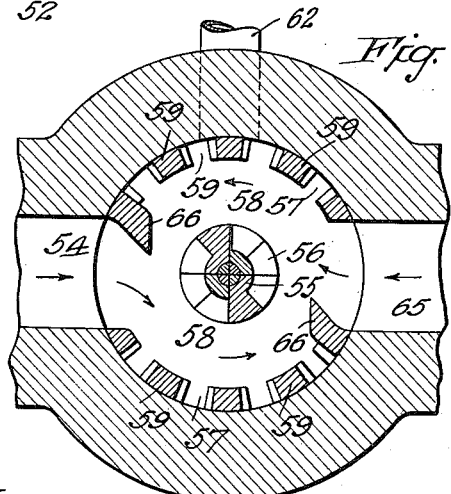
INVENTOR.
Robert Balmer
BY Seward Davis
ATTORNEY.

Patented Apr. 29, 1924.

1,492,116

UNITED STATES PATENT OFFICE.

ROBERT BALMER, OF TORONTO, ONTARIO, CANADA.

DEVICE FOR SEPARATING DUST FROM GASES.

Original application filed December 24, 1921, Serial No. 524,794. Divided and this application filed November 3, 1922. Serial No. 598,702.

*To all whom it may concern:*

Be it known that I, ROBERT BALMER, a subject of the King of the United Kingdom of Great Britain and Ireland, and a citizen of the Dominion of Canada, and a resident of the city of Toronto, in the Province of Ontario, in said Dominion, am the inventor or discoverer of certain new and useful Improvements in Devices for Separating Dust from Gases, of which the following is a description.

My invention consists in certain novel features of construction of refuse disposal plants. It further consists in certain novel features of chimney flue construction whereby valuable products of combustion normally carried off by or with the gases from a combustion chamber through the chimney stack and thus to atmosphere, are separated by centrifugal action from the gases suspending them and precipitated by gravity, and so recovered.

The objects of my invention are so to construct a refuse disposal plant that it may occupy a minimum ground area as a complete unit. A further object is so to construct a refuse disposal unit that the valuable products of combustion otherwise lost by being carried off with the smoke and gases through the chimney flues to atmosphere, shall automatically be separated from the gases with which they are carried off and be recoverable as a desired by-product, and that these gases may be emitted to atmosphere in inocuous condition.

These and incidental minor objects of invention are set forth at length in the ensuing description, and means for attaining these several objects in the best forms now known to be are illustrated in the accompanying drawings, in which—

Figure 1 is a vertical cross sectional view of a refuse destructor plant;

Fig. 2 is a horizontal cross sectional view of the base of a vertical smoke flue on the line II—II of Figs. 1 and 6;

Figure 3 is a perspective view of two pairs of blocks, each block forming a quarter segment of one section of the spiral core of the dust separator and collector forming a part of the smoke flue;

Figure 4 is a vertical cross sectional view of the destructor on the line IV—IV of Fig. 1;

Figure 5 is a vertical cross sectional view of a dust collector on the line V—V of Fig. 1;

Figure 6 is a vertical cross sectional view of the dust collector on the line VI—VI of Fig. 5, showing the separate core;

Figure 7 is a horizontal cross sectional view of the dust collector showing the arrangement of two flues entering the smoke flue of the chimney from opposite sides;

Figure 8 is a vertical cross sectional view of a modified form of separator and collector wherein the path of the combustion products is initially downward and thence upward and outward to the stack;

Figure 9 is a similar view of an alternative modification in which the path of the combustion products is initially upward, thence downward and outward to the stack.

Like numerals of reference indicate same or corresponding parts throughout the several figures.

This application is a division of my companion application, Serial No. 524,794, filed December 24, 1921, for refuse disposal plants.

Referring particularly to Figs. 1 and 4, the numeral 1 is the tipping floor or platform upon which the loaded refuse carts 2 enter the plant. 3 are the covered openings in this floor through which the loads are dumped therefrom. 4 are side walls enclosing the tipping floor, and 5 are windows for admitting light thereto. 9 is the floor above the tipping platform independently supported by the walls 46, which are the walls of the main building housing the plant and which rest upon the foundations 49. The walls 4 of the tipping platform are integral with the walls 47 enclosing a refuse storage bin 10 located immediately beneath the tipping floor. 11 are the doors for the extraction of refuse from the storage bins, 12 the partition walls between these storage bins, and 13 the floor thereof. The walls 47, floor 13, walls 4, and tipping floor 1 form an integral unit supported upon the columns 48 resting upon the independent foundations 52. Vertically beneath the storage bin is the hot air chamber 31 whose floor is the crown 29 of the combustion chamber 28 situated vertically beneath this hot air chamber. The combustion chamber 28 communicates by the exit flue 27 with the furnace chamber 21, which is one of a battery of furnaces 22 having the sliding covers 20 whose withdrawal permits the collapse of the bottom 19 of the feeding hopper 18 located in the furnace loading platform 16, provided with a balustrade 17. From the storage bin 10 the door 11 opens upon the furnace loading platform 16, the inclined chute 14 from the door 11 resting at one end upon the furnace loading platform 16 and being hinged at the other to the bin floor 13. 23 is the furnace door, 24 the fire grate, 25 the ash pit, and 26 the ash pit door. The walls of the series of combustion chambers and of the battery of furnace chambers are each independently supported by the separate foundations 50, 50, 50. 30 is the exit flue from the combustion chamber 28, leading to the dust collector 53 located in the smoke flue 35 leading to the boiler 36, thence to chimney 37, and thence to atmosphere. 62 is an opening or pipe for extraction of dust deposited in the dust collector by means of the suction ventilator 63, and 64 is a discharge pipe therefrom. 51 is the separate and independent foundation of the smoke flue chimney.

41 is an exhaust opening for dust and fumes from the tipping floor corridor. 42 is an exhaust opening for fumes from the storage bin, both openings communicating to the pipe 43 leading to the exhaust fan 44 having the delivery pipe 45 leading in any convenient manner, not here illustrated, to the ash pits 25, as set forth in detail and for the purposes there elaborated in my companion application above referred to.

As will be seen, the several vertical walls have separate foundations mutually independent and preferably not at the same levels, and the several floors supported by these walls are each out of contact with the walls supporting the other floors, whereby shocks upon any one floor are not communicated to other floors. Joints, however, are formed between those walls which do not support a particular floor and it. These are air-sealed, but permit elastic contact, the general arrangement thereof being as follows: the walls 4 forming the corridor of the tipping platform are capped with channels 7 having upwardly extending sides constituting troughs containing sand seals 6 into which extend the downwardly depending vertical diaphragms or baffles which are integral with the floor 9. Similarly, the wall of the chimney 35 is provided with a circular channel iron 38 forming by its vertically extending flanges a trough containing the sand seal 40 entered by the baffles 39 downwardly depending from the floor 9. In the same manner the hot air chamber 31 is surrounded by vertical flanges 32 extending downwardly from the floor 13 and engaging the sand seal 34 contained in the trough 33 resting upon the crown 29 of the chamber 28.

The dust collector 53 shown in Fig. 1, and in an enlarged view in Fig. 6, has the entrance 54 from the flue 30 from the combustion chamber 28 located at the base thereof. The collector comprises essentially a spiral core 55 concentric with its wall 53. This core has the spiral flange 56 forming part thereof, forming a spirally ascending path for the gases entering at 54, to which it imparts a rotary motion by virtue of which centrifugal force acts upon the heavier particles of matter carried thereby, causing them to impinge against the sides of the zig-zag vertical channels 57.

Figure 3 is a detail of the assembly of one course of the bricks forming the spiral core. These bricks are of two shapes, diagonal members being alike, each being one segment of the course and having vertical extensions adapted to dovetail in corresponding recesses of the course above, thus constituting a solid column united at the top by the cap 55$^a$. One pair of similar bricks, shown in Fig. 3, carry the beginning and end of one revolution of the thread forming the spiral pathway, and the other pair of similar bricks carry the intervening flight of the thread connecting the beginning and end of portions of the same thread borne by the pair adjoining it, as shown in the cut-away portion of the core illustrated in Fig. 6 and in the plan views thereof shown in Figs. 2 and 7.

58 is the passage-way for the main column of gases. 59 are the beveled-ended bricks forming the sides of the zig-zag channels. 60 are the bricks or tiles closing the upper end of the zig-zag channels.

As shown in Fig. 5, 61 are the horizontal rows of flanged bricks in the wall over the entrance to the dust collector. As shown in Fig. 7, 62 is the opening or pipe for the extraction of the dust deposited, and 65 an additional smoke flue entrance. 66 are beveled baffles to deflect, as shown by the arrows, the currents of gases and to impart an initial direction thereto.

In the modifications shown in Figs. 8 and 9, the dust collector is represented in more compact form, as may be desirable in certain locations, but involves the same principle of operation. In Fig. 8, 68 is the entrance to the dust collector, having the exterior wall 70, of a downward-upward form, in which the entering gases pass downwardly about the spiral core 55 and around its spiral flanges 56, throwing off by centrifugal action the dust particles into the zig-zag vertical channels 57. The gases then pass upwardly through the passage 58$^a$ and around the spiral flanges 56$^a$ formed upon the core 69 exterior to the central core, the direction of rotation being preserved by the pitch of the respective flanges, the dust being thus thrown off and collected by the zig-zag vertical channels 57. In Fig. 9 is shown a dust collector of upward and downward form having the exterior wall 73 and the entrance 71 through which the gases pass to the passage 58 having the spiral core 55 centered therein, provided with the spiral flanges 56. Upon the exit of the gases from the top of the passage 58 they are deflected and returned through the passage 58ª downwardly, maintaining their direction of revolution and circulating around the exterior core 72 provided with the spiral flanges 56ª. The whirling effect communicated to the gases during their passage through 58 causes the suspended dust particles to impinge against the vertical zig-zag channels 57 and the dust to fall by gravity therethrough, permitting its removal through the pipe 62. Upon the downward passage of these gases about the exterior core, the particles are similarly thrown off and collected by the zig-zag vertical channels 57 and fall downward by gravity and are collected through the supplemental opening 62ª for the extraction of dust, the gases thus passing to atmosphere through the flue 35.

When a refuse destructor is functioning properly the fire brick linings of the furnace chamber, of the combustion chamber, and of the accessory smoke flues are kept incandescent. In this condition such linings are extremely brittle and liable to crack and fall apart if subjected to shocks or vibrations. In the normal operation of a destructor plant, these shocks or vibrations usually arise in two ways: first, by the passage and arrival of the heavily laden carts or vans, which jar any road or bridge over which they pass; and second by the discharge of their loads of refuse, which vary in weight from one to ten tons. This heavy mass, sometimes falling from a considerable height, produces a violent shock to the structure of the storage bin where it is kept prior to being charged into the furnace. As the fires are more conveniently fed from a bin placed as nearly as possible over the furnace, and as for the same reason of convenience the carts or vans should preferably discharge from a position above or beside the storage chamber or bin, it follows that the most convenient general relation of tipping floor, storage bin and furnace chamber is that shown in the accompanying figures. In this position of greatest operating convenience, the two sources of shock or vibration, namely the tipping floor and the refuse storage bin, are in close proximity to the furnace, combustion chambers and smoke flues, with their incandescent, brittle fire brick linings. Such proximity increases the possibility and the effects of shocks and vibration communicated from the movement of the carts and the discharge of their loads, hence the importance of insulating the furnace and combustion chambers and smoke flues from all rigid contact with the structure containing or supporting the tipping platform and the storage bin. This is accomplished, first, by keeping the foundations separate, those carrying the tipping floor and storage bin being preferably deeper than the others; second, by keeping these structures above their foundations also free from all rigid contact.

In this way injurious shocks and vibrations from the refuse dumping on the tipping platform and in the storage bin are kept from affecting the delicate fire brick structure below and the building and its contents above, while at the same time the sanitary ventilation of the tipping floor is made easier.

When, as in the drawings, the smoke flue communicates with the boiler in a floor above, it is advisable to insulate the flue from any but an elastic contact with the boiler or floor upon which it and accessory machinery are supported. The contact may be through a sand seal or any other elastic contact device, the purpose being to save the incandescent brickwork of the smoke flue from shocks and vibrations.

Another of the special inconveniences of refuse destructor operation which it is the object of this invention to eliminate or reduce to a minimum is the large quantities of dust which, swept by the strong current of the gases, from the furnace chamber through the combustion chamber, into the smoke flue leading to the boiler, tend to choke up the latter, to the serious detriment of its efficiency, and are even carried up through the chimney and distributed over the neighborhood. The large proportion of dust in the destructor gases is due to the presence of large proportions of dust in the refuse itself, and also to the loose texture of much of the refuse, and to the use of forced draft, in order to sustain the high temperatures necessary to decompose and destroy the heavy, difficult and dangerous gases given off by the heated organic matter. It may be noted that, whereas in a coal furnace a rate of combustion of 30 lbs. per square foot per hour is considered satisfactory, a rate of 80 to 100 lbs. is the rate now called for in a refuse destructor. The natural consequence is a violent movement of air and gases through the fuel on the fire grate and the lifting and sweeping of much light material from the fire grate and into the combustion chamber, mingling with the rushing gases and offering a serious problem of dust separation which this invention is designed to solve.

Various devices have been generally adopted to catch this dust before it reaches the boiler. Some of them are the use of baffles in a horizontal flue, and others are simply the well-known centrifugal separator. In my invention I utilize the centrifugal principle to the extent of inserting a spiral core in the center of a vertical flue. But, in the sides of the flue, I construct vertical zig-zag channels, in the inner wall of the flue. Into these channels the whirling thrust of the ascending gases throws all particles of dust as they reach the outer edge of the gaseous column. These vertical channels, moreover, are closed at the top, so that the natural upward movement of the gases in the channels is arrested. The slackened movement of the gases in the channels makes it difficult for the accumulating dust to remain in suspension. To arrest still further the upward movement of the gases in the channels, these are built with horizontal alternating baffles on both sides. As shown in the drawings, the baffles are made with a sharp bevel or incline downwards, so that, while arresting the gas and catching the dust, they allow the latter to slip easily downward to the bottom of the flue, from which it may be periodically withdrawn either by hand or some convenient mechanical device such as the suction fan shown in the drawing.

The principle of this collector of dust from flue gases is equally applicable, with slight variations, to gases flowing vertically downward instead of upward, or by the use of concentric ring construction, to combine in one apparatus both the ascending and descending currents of gas, as shown in the modifications illustrated in Figs. 8 and 9. In the former application, the gas descends and then ascends. In the latter, the path is reversed, the gas first ascending through the inner ring and descending through the space between the two rings,—the zig-zag vertical channels as well as the guiding spiral flanges being essential features of the inner and outer surfaces of the moving columns of gases in both modifications, and the vertical staggered channels in the inner and outer flue walls being also provided.

While the vertical channels may be built all round the inner periphery of the apparatus, I prefer, as shown in the drawings, to vary the method of construction for a short distance upward vertically over the entrance point of the gases. At this point, I prefer to use, for a short distance upward, parallel lines of bricks with beveled edges, the bevel being sharply downward. I prefer this construction for the purpose of strengthening the brickwork at that weak point.

In a vertical cylindrical smoke flue, the construction of a concentric dust collector which reverses the flow of the gases, as shown as modifications, is sometimes preferable, but in all cases the underlying principle is the same; in these modifications there is provided a central spiral-flanged core, a cylindrical wall or partition parallel to the core, removed therefrom a convenient distance for passage of the gases and provided with vertical channels in the face of wall towards the central core but spirally flanged on the outer surface in the reverse direction or inclination to the flanges of the central core, while again at a distance sufficient to allow the free passage of the gases, an outer lining of fire brick with a similar arrangement of vertical channels is provided, the object being to obtain in substantially the same exterior length a double course in which the gas is rotated or swirled by centrally located spiral flanges and the dust particles impelled by centrifugal force outwards against the fire brick lining, where they are caught in the vertical channels and drop by gravity downward through the relatively slackened volume of gas in the aforesaid channels, the dust being then easily removable by hand or mechanical means and the gas relatively free of dust particles and therefore less injurious to the action of boilers and less of a nuisance when emitted to the atmosphere from the chimney.

When the gases flow into the dust separator from two opposite points, as convenience may sometimes make advisable, I deflect the gases, as shown in Fig. 7 of the drawings, by baffles at each entrance, so set as to send the gases in the same direction as that of the spirals on the central core.

The construction of the spiral core and the speedy repair of same are accomplished best by the use of the special bricks or blocks formed whole or in two segments, as shown, and moulded so as to key into one another and form the continuous spiral, whether single or multiple, which is more effective than the interrupted formation.

In the same way, by the use of special radial bricks, either beveled on one face or at one end, all the requirements described for the parallel horizontal bevels and the zig-zag vertical or staggered channels are best met.

Having thus described my invention, I claim:

1. In a refuse destructor, a dust separator comprising a smoke flue, a solid central core therein, a flange spirally disposed about said core and free from contact with said flue, and grooves vertically disposed about the lining of said flue.

2. In a refuse destructor, a dust separator comprising a smoke flue, a central core therein, a flange spirally disposed about said core, and zig-zag grooves vertically disposed about said flue.

3. In a refuse destructor, a dust separator and collector comprising a smoke flue, means adapted to impart a spiral motion to the dust-laden gas passing therethrough, and means adapted to retard the particles of dust thrown off by the centrifugal effect of such spiral motion and to permit gravity to act thereon, the said retarding means consisting of a plurality of zig-zag grooves vertically disposed about said flue, the sides of said grooves presenting surfaces opposed to the directions of movement of the dust-laden gas both in its horizontal and vertical motion.

4. In a refuse destructor, a dust separator comprising a smoke flue and a columnar concentric core therein, said core consisting of a plurality of courses of spirally threaded bricks, each course composed of four bricks, diagonally disposed bricks being alike and adjacent bricks being unlike, a dust-laden passage being afforded between the wall of the smoke-flue and said core.

5. In a refuse destructor, a dust separator comprising a smoke flue and a columnar concentric core therein, said core consisting of a plurality of courses of spirally threaded bricks, each course composed of four bricks, diagonally disposed bricks being alike and adjacent bricks being unlike, each course affording a pair of threads, the beginning of each pair registering with the ending of the pair upon the course below it, the periphery of the spiral formed thereby about said core affording a clearance between it and the flue wall of less width than the depth of the spiral thread.

6. In a refuse destructor, a dust separator comprising a smoke flue and a columnar concentric core therein, said core consisting of a plurality of courses of spirally threaded bricks, each course composed of four bricks, diagonally disposed bricks being alike and adjacent bricks being unlike, each course affording a pair of threads, the beginning of each pair registering with the ending of the pair upon the course below it, and each member of each course having an upwardly projecting part adapted to be received in a circular recess formed by the recessed junction of the members constituting the overlying course, a dust-settling passage being afforded between the wall of the smoke-flue and said core.

7. In a dust separator, a central core, a spiral vane thereabout, a vertical flue concentric therewith and spaced therefrom, a second flue surrounding and concentric with the first and in communication therewith, a spiral vane therein, and a deflector closing the top of said second flue, the dispositions of the respective spirals of the vanes being such as to maintain the initial direction of rotation of the flow of current therethrough.

8. In a refuse destructor, a dust separator comprising a smoke flue, a central core having a spiral-vane thereabout, a concentric cylindrical partition midway between said core and the wall of said flue, said partition having vertically disposed projections upon its interior adapted to afford zig-zag grooves therebetween and having a spirally disposed vane about its exterior, and a deflector adapted to turn the current ascending between the core and cylinder downwardly and through the circular opening between the cylinder and flue without affecting its direction of rotation.

9. In a refuse destructor, a dust separator comprising a smoke flue, a central core having a spiral-vane thereabout, a concentric cylindrical partition midway between said core and the wall of said flue, said partition having vertically disposed projections upon its interior adapted to afford zig-zag grooves therebetween and having a spirally disposed vane about its exterior, a deflector adapted to turn the current ascending between the core and cylinder downwardly and through the circular opening between the cylinder and flue without affecting its direction of rotation, and a series of ribs extending vertically about said flue and adapted to afford a plurality of zig-zagged grooves therebetween.

10. In a refuse destructor, a dust separator and collector comprising a smoke flue and baffles disposed about the intake thereto adapted to impart a rotary motion to the smoke and gases upon entrance, a centrally disposed self-supporting core composed of spirally-vaned bricks, a deflecting member adapted to direct the ascending spiral current downwardly, a cylindrical member surrounding said core, the interior of said member having vertically disposed ridges affording discontinuous grooves therebetween, and the exterior of said member having spirally disposed vanes adapted to maintain the direction of rotation of the current.

11. In a refuse destructor, a vertical cylindrical smoke flue, in the center of which is a columnar core having flanges arranged in continuous spiral in the same direction, said flanges being spaced from said flue and adapted to cause a rotary swirling motion in the currents of gases passing therethrough, said flanges being spaced from said flue.

12. In a refuse destructor, a vertical cylindrical smoke flue, in the center of which is a cylindrical core having flanges arranged in continuous spiral in the same direction and adapted to cause a rotary swirling motion in the currents of gases passing therethrough, vertical channels in the inner surface of the wall of the flue open toward the central core but closed at the end furthest removed from the entrance of the gases.

13. In a refuse destructor, a vertical cylindrical smoke flue in the center of which is a cylindrical core having flanges arranged in continuous spiral in the same direction and adapted to cause a swirling motion in the currents of gases passing therethrough, and vertical zig-zag channels in the inner surface of the walls of the flue open toward the central core but closed at the end furthest removed from the entrance of the gases.

14. In a refuse destructor, a vertical cylindrical smoke flue, the inner surface of whose wall is fluted with vertical channels open toward the center of the flue, these channels being severally closed at their tops.

15. In a refuse destructor, a cylindrical smoke flue lined with bevel-edged blocks disposed with vertical zig-zag channels therebetween, and a concentric core in said flue with spiral flanges pitched in the same general direction.

16. In a refuse destructor, a vertical cylindrical smoke flue lined with horizontal parallel projecting rows of bricks in its inner surface of the flue wall, as dust arresters and presenting baffle faces opposed to the direction of flow of gases, and a central spiral flanged core in said flue adapted to give a rotary swirling motion to the ascending gases.

17. In a refuse destructor, a vertical cylindrical smoke flue having a lining of fire bricks loose in its individual units and separate from the ordinary fire brick or other lining of the flue, and constructed with horizontal or vertical channels as dust-arresters in conjunction with a spiral-flanged core in the center of the flue.

18. In a dust separator, an inner cylindrical flue, a central core therein supported independently therefrom and a spiral vane about said core; an outer cylindrical flue surrounding said inner flue and concentric therewith; a spiral vane about the exterior wall of said inner flue and within said outer flue, and means adapted to cause the dust-laden gas to pass from one flue to the other, the pitch of the vanes being such that the direction of the rotation of the gas continues.

ROBERT BALMER.